(12) United States Patent
Satake et al.

(10) Patent No.: US 7,662,937 B2
(45) Date of Patent: Feb. 16, 2010

(54) POLYMERIZABLE DYE AND OPHTHALMIC LENS CONTAINING THE SAME

(75) Inventors: Kohsuke Satake, Nagoya (JP); Kazuharu Niwa, Nagoya (JP)

(73) Assignee: Menicon Co., Ltd., Aichi (JP)

( * ) Notice: Subject to any disclaimer, the term of this patent is extended or adjusted under 35 U.S.C. 154(b) by 157 days.

(21) Appl. No.: 11/910,758

(22) PCT Filed: Mar. 3, 2006

(86) PCT No.: PCT/JP2006/304092
§ 371 (c)(1),
(2), (4) Date: Oct. 5, 2007

(87) PCT Pub. No.: WO2006/112173
PCT Pub. Date: Oct. 26, 2006

(65) Prior Publication Data
US 2009/0082553 A1    Mar. 26, 2009

(30) Foreign Application Priority Data
Apr. 8, 2005    (JP) .............. 2005-112401

(51) Int. Cl.
C09B 43/18    (2006.01)
G02C 7/04    (2006.01)

(52) U.S. Cl. .............. 534/591; 534/683; 351/163

(58) Field of Classification Search .............. None
See application file for complete search history.

(56) References Cited
FOREIGN PATENT DOCUMENTS

| | | |
|---|---|---|
| JP | 60-142324 | 7/1985 |
| JP | 61-52873 A | 3/1986 |
| JP | 02-196809 | 8/1990 |
| JP | 2-232056 A | 9/1990 |
| JP | 6-88066 A | 3/1994 |
| JP | 06-121826 | 5/1994 |
| JP | 07-029811 | 1/1995 |
| JP | 2604799 | 1/1997 |
| JP | 2685980 | 8/1997 |
| JP | 10-251537 | 9/1998 |
| JP | 11-056998 | 3/1999 |
| JP | 2003-144538 | 5/2003 |
| WO | WO 2004/006379 A1 | 1/2004 |

OTHER PUBLICATIONS

International Preliminary Report on Patentability; International application No. PCT/JP2006/304092; International filing date: Mar. 3, 2006, Report issued Oct. 9, 2007.
Written Opinion of the International Searching Authority; International Application No. PCT/JP2006/304092; International filing date: Mar. 3, 2006.
International Search Report; International application No. PCT/JP2006/304092; Date of Mailing: Apr. 25, 2006.

*Primary Examiner*—Fiona T Powers
(74) *Attorney, Agent, or Firm*—Antonelli, Terry, Stout & Kraus, LLP.

(57) ABSTRACT

A novel benzophenone type polymerizable dye containing a urethane bond and an ophthalmic lens containing the said polymerizable dye are disclosed. The benzophenone type polymerizable dye is shown by the following general formula (1)

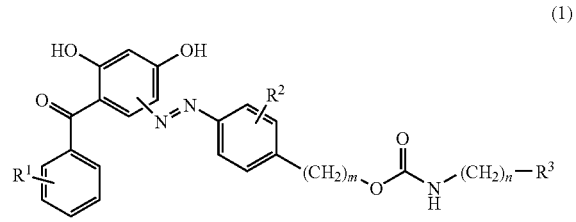

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m and n are respectively and independently an integer of 0 to 18. $R^3$ is any of a polymerizable functional group of a vinyl group, an acryloyl group or a methacryloyl group).

16 Claims, 3 Drawing Sheets

POLYMERIZABLE DYE AND OPHTHALMIC LENS CONTAINING THE SAME

RELATED APPLICATION

This application under 35 U.S.C. §371 is the U.S. national phase of International Application No. PCT/JP2006/304092 filed Mar. 3, 2006, which claims priority of Japanese Patent Application No. 2005-112401 filed On Apr. 8, 2005.

TECHNICAL FIELD

The present invention relates to a novel polymerizable dye and its production method, and an ophthalmic lens containing the dye.

BACKGROUND ART

Hereinbefore, against a disease caused by a crystalline lens, such as cataract, a remedial method by an intraocular lens and a contact lens has been adopted. However, while a natural crystalline lens has a property that an ultraviolet (UV) ray and visible lights in a blue range of about 380 to 500 nm are not transmitted, a polymethyl methacrylate, etc. which has conventionally most widely been used as a lens material can transmit visible lights and an UV ray, and thus there has been such a problem that wearing an ophthalmic lens made of this material causes dazzling and bluish sight as compared with a natural eye. Further, it has been considered that retina is damaged by using a conventional lens material permeating an UV ray.

Hereinbefore, as a material for an ophthalmic lens having absorption property of an UV ray and visible lights having specific wave length range (about 380 to 500 nm), a benzophenone type polymerizable UV-absorbable dye has been known (Japanese Patent Publication No. H2-232056A). Specifically, the compound has been obtained by reacting 2,4-dihydroxy-5-(4-(2-hydroxyethyl)phenylazo) benzophenone (UV-PEP) and the like with a compound having a polymerizable group such as methacryloyl chloride. However, the pigment disclosed in Japanese Patent Publication No. H2-232056A contains no urethane group, and thus when it is used in a large amount in a foldable intraocular lens made of a soft acrylic acid resin (hereinafter referred to as a soft foldable intraocular lens), there have been observed such problems that the implant becomes hard and the function of the said intraocular lens of inserting into an eye under bending is prohibited or lowered.

Further, when UV-PEP is reacted with methacrylic acid according to the disclosure of the patent publication, such a problem has been accompanied that a product produced by reacting with a phenolic hydroxyl group is produced as well as the desired product produced by reacting with a primary hydroxyl group, because UV-PEP contains one primary hydroxyl group and two phenolic hydroxyl groups, and thus yield of the desired product is reduced remarkably, and production in an industrial scale is very difficult because of difficulty in separation and purification.

DISCLOSURE OF INVENTION

The object of the present invention is to provide a novel benzophenone type polymerizable dye containing a urethane bond and its production method, and also relates to an ophthalmic lens material containing the dye.

Namely, the present invention relates to a benzophenone type polymerizable dye shown by the following general formula (1), and the benzophenone type polymerizable dye shown by the following general formula (2) is preferable.

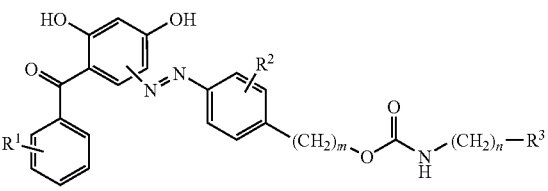

(1)

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m and n are respectively and independently an integer of 0 to 18. $R^3$ is a polymerizable functional group of any of

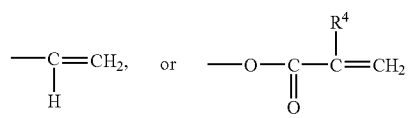

in which $R^4$ is a hydrogen atom or a methyl group).

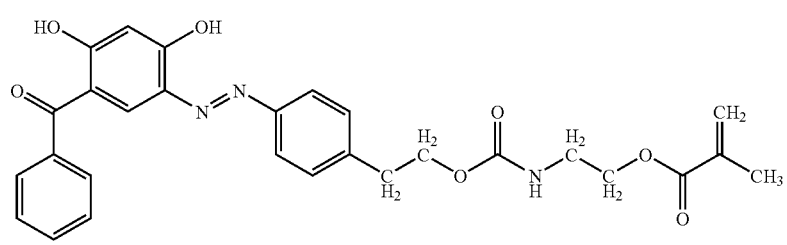

(2)

EXAMPLES

The present invention also relates to a method for producing a benzophenone type polymerizable dye containing a urethane group comprising reacting a compound shown by the following general formula (3) with a compound shown by the following general formula (4).

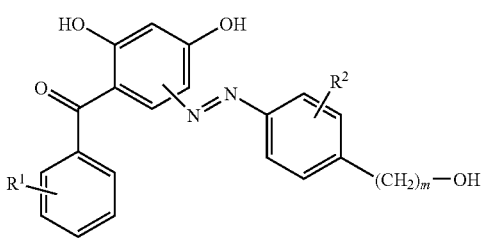

(3)

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m is an integer of 0 to 18.

(4)

(wherein $R^3$ is a polymerizable functional group of any of

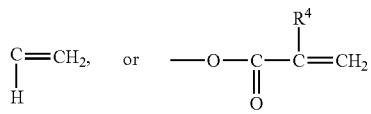

in which $R^4$ is a hydrogen atom or a methyl group, and n is an integer of 0 to 18).

It is preferable that the compound shown by the above general formula (3) is a compound shown by the following general formula (5) and the compound shown by the above general formula (4) is a compound shown by the following general formula (6).

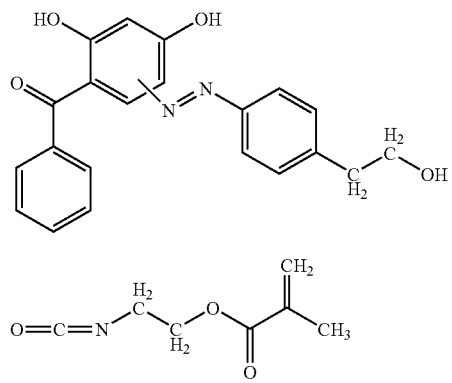

The above reaction is preferably conducted in the presence of a catalyst.

The present invention also relates to an ophthalmic lens comprising the above polymerizable dye, and it is preferable that an amount of the above polymerizable dye is 0.001 to 1.0 part by weight relative to 100 parts by weight of the total polymerizable monomer moieties, and further that it contains an UV absorber and/or other dye.

BEST MODE FOR CARRYING OUT THE INVENTION

Figure 1:
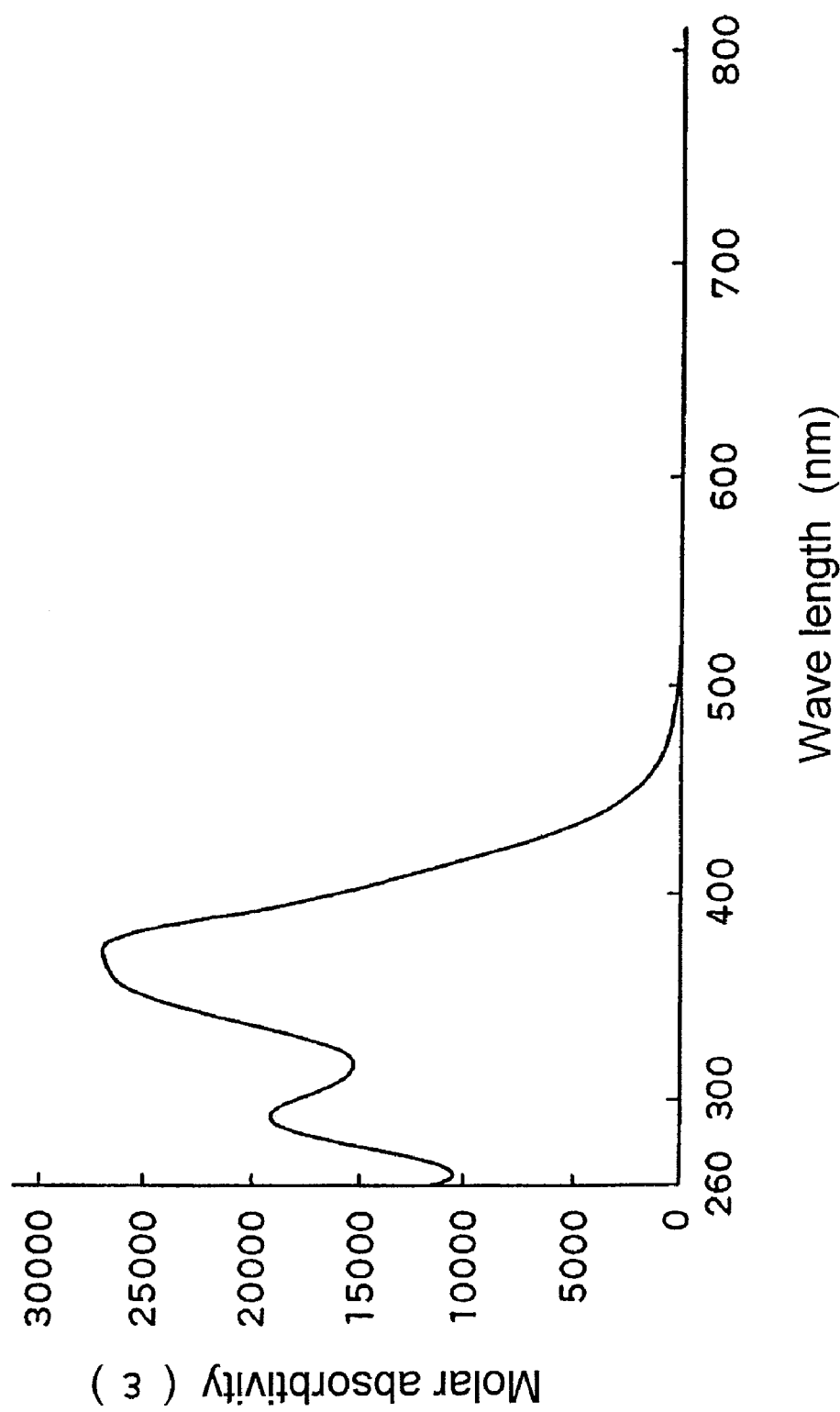
FIG. 1 is a chart showing UV visible absorption spectrum of the benzophenone type polymerizable dye synthesized in the Synthetic Example 1.

The present invention relates to a benzophenone type polymerizable dye shown by the following general formula (1).

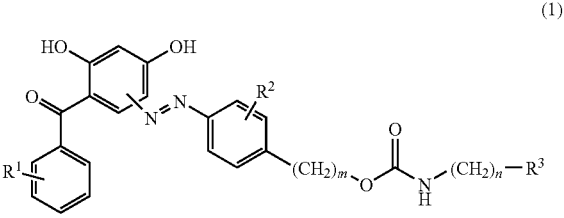

(1)

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, preferably a hydrogen atom from a viewpoint of yield of a precursor before introduction of a polymerizable group. And m and n are respectively and independently an integer of 0 to 18, and preferably m and n are respectively and independently 2 to 4, still preferably 2, from a viewpoint of stability of the compound itself in m and of polymerizability in n.

$R^3$ is a polymerizable functional group of any of

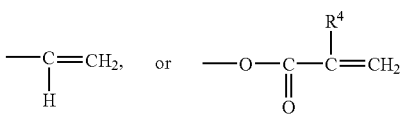

in which $R^4$ is a hydrogen atom or a methyl group).

The polymerizable dye shown by the general formula (1) includes 2,4-dihydroxy-5-(4-(2-(N-(2-methacryloyloxyethyl)carbamoyloxy)ethyl)phenylazo)benzophenone, 2,4-dihydroxy-3-(4-(2-(N-(2-methacryloyloxyethyl)carbamoyloxy)ethyl)phenylazo)benzophenone, 2,4-dihydroxy-5-(4-(4-(N-(2-methacryloyoxyethyl)carbamoyloxy)butyl) phenylazo)benzophenone, 2,4-dihydroxy-2'-methyl-5-(4-(2-N-(2-methacryloyloxyethyl)carbamoyloxy)ethyl)phenylazo)benzophenone, 2,2',4-trihydroxy-5-(4-(2-(N-(2-methacryloyloxyethyl)carbamoyloxy)ethyl)phenylazo)benzophenone, 2,4-dihydroxy-4'-methoxy-5-(4-(2-N-(2-methacryloyloxyethly)carbamoyloxy ethyl)phenylazo)benzophenone 2,4-dihydroxy-5-(4-(2-(N-(4-methacryloyloxybutyl)carbamoyloxy)ethyl)phenylazo)benzophenone etc. Among them, 2,4-dihydroxy-5-(4-(2-(N-(2-methacryloyloxyethyl)carbamoyloxy)ethyl)phenylazo)benzophenone is preferable from a view point of increasing fastness against lights of the resulting ophthalmic lens. The term of "(meth)acryloyl" means two compounds of "acryloyl" and "methacryloyl".

The 2,4-dihydroxy-5-(4-(2-(N-(2-methacryloyloxyethyl) carbamoyloxy)ethyl)phenylazo)benzophenone (hereinafter referred to as BMAC) is shown by the following formula (2).

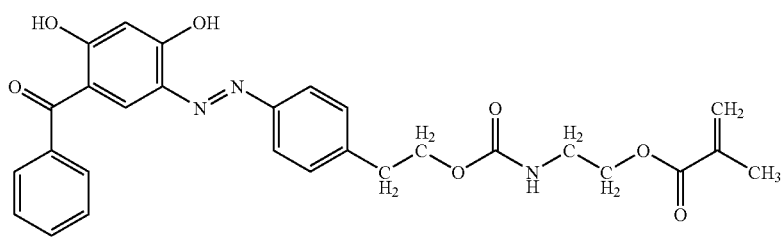

(2)

The polymerizable dye shown by the general formula (1) of the present invention contains a UV-ray absorbing part and a visible light (about 380 to 500 nm) absorbing part in a molecule. And, as the polymerizable dye of the present invention contains an urethane bond, it is more flexible than conventional polymerizable dyes, and particularly even when it is used in a flexible fordable intraocular lens, its flexible properties are not deteriorated, and further as a chromophore and a polymerizable group are sterically-separated from each other, it has such property that no polymerization suppression is given.

The polymerizable dye of the present invention has a maximum absorption wave length at 350 to 450 nm, preferably 360 to 400 nm, and a molar absorbtivity in this case is preferably 10,000 to 60,000.

An elution rate of the polymerizable dye from an ophthalmic resin comprising the polymerizable dye of the present invention is preferably 0.01% by weight or less, still preferably 0.001% by weight or less after immersion in ethanol at 40° C. for 24 hours.

The present invention also relates to a method for producing a benzophenone type polymerizable dye containing a urethane bond comprising a process of reacting a compound shown by the following general formula (3) with a compound shown by the following general formula (4).

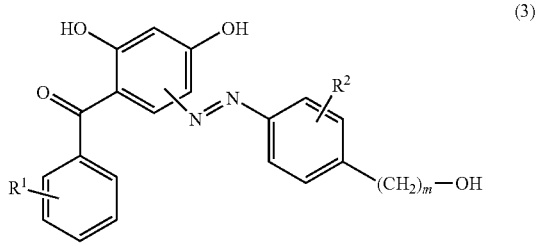

(3)

(wherein $R^1$, $R^2$ and m are same as in the above general formula (1). Specifically, $R^1$ and $R^2$ are respectively and independently a hydrogen atom, a hydroxyl group, a carboxyl group, a C1 to C8 alkyl group, a C1 to C8 alkoxy group, a sulfonic acid group or a benzyloxy group, and the like, and preferably a hydrogen atom from a viewpoint of yield of a precursor before introduction of a polymerizable group. m is an integer of 0 to 18, and preferably 2 to 4, still preferably 2, from a viewpoint of stability of the compound itself).

(4)

(wherein $R^3$ and n are same as in the above general formula (1). Specifically $R^3$ is a polymerizable functional group of any of

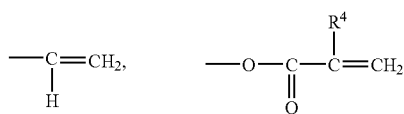

in which $R^4$ is a hydrogen atom or a methyl group. And n is an integer of 0 to 18, preferably 2 to 4, still preferably 2 from a polymerizability point of view).

The compound shown by the general formula (3) includes 2,4-dihydroxy-5-(4-(2-hydroxyethyl)phenylazo) benzophenone, 2,4-dihydroxy-3-(4-(2-hydroxyethyl)phenylazo)benzophenone, 2,4-dihydroxy-5-(4-(4-hydroxybutyl)phenylazo)benzophenone, 2,4-dihydroxy-2'-methyl-5-(4-(2-hydroxyethyl)phenylazo)benzophenone, 2,2',4-trihydroxy-5-(4-(2-hydroxyethyl)phenylazo)benzophenone, 2,4-dihydroxy-4'-methoxy-5-(4-(2-hydroxyethyl)phenylazo) benzophenone, and the like. Among them, 2,4-dihydroxy-5-(4-(2-hydroxyethyl)phenylazo)benzophenone is preferable.

The compound shown by the general formula (4) includes 2-isocyanate ethyl methacrylate, 4-isocyanate butyl methacrylate, 2-isocyanate ethyl acrylate, and the like. Among them, 2-isocyanate ethyl methacrylate is preferable in a case of using the dye of the present invention together with other polymerizable UV absorber.

As the compound shown by the general formula (3) contains one primary hydroxyl group and two phenolic hydroxyl groups, a large amount of byproducts produced by reaction with the phenolic hydroxyl group are produced in a case of introducing a polymerizable double bond into the compound shown by the general formula (3). And, a polymerizable double bond can selectively be introduced into the primary hydroxyl group of the compound shown by the general formula (3) when the compound shown by the general formula (4) and specific catalyst are used.

In a case of reacting the compound shown by the general formula (3) with the compound shown by the general formula (4), use of an additional catalyst is preferable in order to accelerate a reaction speed selectively.

The catalyst used in the present invention includes a base such as triethylamine, pyridine and sodium acetate, an inorganic salt such as aluminum chloride, an organic metal compound such as $R_2Sn_nCl_2$ and $R_2Sn(OCOR')_2$ (wherein R and R' are respectively and independently a alkyl group), an acetyl acetonate complex of Fe, Ni, Mn, Zn, Cu and Al, and the like, and the organic metal compound and the metal complex are preferable from a viewpoint of suppressing production of byproducts, among the catalysts, dibutyl tin (IV) dilaurate and tris(2,4-pentane dionate) iron (III) are still preferable because they show high selectivity and effective for acceleration of a reaction rate.

The reaction between the compound shown by the general formula (3) and the compound shown by the general formula (4) is generally conducted in a solvent such as dichloromethane, chloroform, dimethylformamide, dimethylsulfoxide, tetrahydrofuran, benzene, toluene, carbon tetrachloride, 1,4-dioxan and moldthyl ether.

A ratio of the compound shown by the general formula (3) to the compound shown by the general formula (4) in 1 L of the solvent is that 1 to 10 mole, preferably 1 to 2 mole of the compound shown by the formula (4) to 1 mole of the compound shown by the general formula (3). When it is less than 1 mole, the compound shown by the general formula (3) does not react and remains in the system, and thus purification tends to be difficult, and when it is over 10 mole, byproducts tend to produce.

An amount of the catalyst to be incorporated is preferably 0.03 to 0.1 mole, still preferably 0.03 to 0.05 mole, relative to 1 L of the solvent. When it is less than 0.03 mole, the reaction rate tends to slow remarkably, and when it is over 0.1 mole, purification for removing the catalyst tends to be difficult.

Purification of the object compound after the reaction can be conducted by a conventional method such as using a column, and also can be conducted by a simple method such as recrystallization from an alcohol because the object compound shows high purity. As the alcohol, a conventionally used one such as methanol and ethanol is used, and ethanol is preferable because an amount of the solvent can be reduced.

The polymerizable dye of the present invention contains an UV absorption and absorption of visible lights having a specific wave length (about 380 to 500 nm), and shows excellent resistance against light and chemicals, and further shows high fastness and shows no elution even when it is polymerized with other monomer, and thus it can be used as a material of an ophthalmic lens and also as coating agent, building materials and the like.

The ophthalmic lens of the present invention is obtained by copolymerizing the above benzophenone type polymerizable dye with other polymerizable monomer, etc.

As the polymerizable monomer used in the present invention, there is no specific restriction and one generally used as an ophthalmic lens material can be used. The examples are as follows: straight chain, branched chain and cyclic alkyl (meth)acrylates, including methyl(meth)acrylate, ethyl (meth)acrylate, propyl(meth)acrylate, isopropyl(meth)acrylate, butyl(meth)acrylate, tert-butyl(meth)acrylate, isobutyl (meth)acrylate, pentyl(meth)acrylate, tert-pentyl(meth)acrylate, hexyl(meth)acrylate, heptyl(meth)acrylate, octyl (meth)acrylate, 2-ethylhexyl(meth)acrylate, nonyl(meth)acrylate, decyl(meth)acrylate, dodecyl(meth)acrylate, stearyl (meth)acrylate, cyclopentyl(meth)acrylate, cyclohexyl (meth)acrylate, etc.; a silicon-containing (meth)acrylate, including pentamethyl disiloxanylmethyl(meth)acrylate, pentamethyl disiloxanylpropyl(meth)acrylate, methyl bis(trimethyl siloxy)silyl propyl(meth)acrylate, tris(trimethyl siloxy) silyl propyl(meth)acrylate, mono(methyl bis(trimethyl siloxy)siloxy) bis(trimethyl siloxy)silyl propyl(meth)acrylate, tris(methyl bis(trimethyl siloxy)siloxy)silyl propyl (meth)acrylate, methyl bis(trimethyl siloxy)silyl propyl glyceryl(meth)acrylate, tris(trimethyl siloxy)silyl propyl glyceryl(meth)acrylate, mono(methyl bis(trimethyl siloxy) siloxy) bis(trimethyl siloxy)silyl propyl glyceryl(meth)acrylate, trimethyl silyl ethyl tetramethyl disiloxanyl propyl glyceryl(meth)acrylate, trimethyl silyl methyl(meth)acrylate, trimethyl silyl propyl(meth)acrylate, trimethyl silyl propyl glyceryl(meth)acrylate, pentamethyl disiloxanyl propyl glyceryl(meth)acrylate, methyl bis(trimethyl siloxy)silyl ethyl tetramethyl disiloxanyl methyl(meth)acrylate, tetramethyl triisopropyl cyclotetra siloxanyl propyl(meth)acrylate, tetramethyl triisopropyl cyclotetra siloxy bis(trimethyl siloxy) silyl propyl(meth)acrylate, tetramethyl triisopropyl cyclotetra siloxy bis(trimethyl siloxy)silyl propyl(meth)acrylate, etc.; fluorine-containing (meth)acrylates, including trifluoroethyl(meth)acrylate, tetrafluoropropyl(meth)acrylate, pentafluoropropyl(meth)acrylate, hexafluoroisopropyl (meth)acrylate, tetrafluoro-tert-pentyl(meth)acrylate, hexafluorobutyl(meth)acrylate, hexafluoro-tert-hexyl(meth) acrylate, octafluoropentyl(meth)acrylate, 2,3,4,5,5,5-hexafluoro-2,4-bis(trifluoromethyl)pentyl(meth)acrylate, dodecafluoroheptyl(meth)acrylate, 2-hydroxyoctafluoro-6-trifluoromethylheptyl(meth)acrylate, 2-hydroxydodecafluoro-8-trifluoromethylnonyl(meth)acrylate, 2-hydroxyhexadecafluoro-10-trifluoromethylundecyl(meth)acrylate, etc.; styrene derivatives, including styrene, pentafluoro styrene, methyl styrene, trimethyl styrene, trifluoromethyl styrene, (pentamethyl-3,3-bis(trimethyl siloxy)trisiloxanyl)styrene, (hexamethyl-3-trimethyl siloxy trisiloxanyl)styrene, dimethylamino styrene, etc.; hydroxy-containing (meth) acrylates, including hydroxyethyl(meth)acrylate, hydroxypropyl(meth)acrylate, hydroxybutyl(meth)acrylate, moldthylene glycol mono(meth)acrylate, triethylene glycol mono (meth)acrylate, dipropylene glycol mono(meth)acrylate, etc. (meth)acrylic acid; vinyl lactams, including N-vinyl pyrrolidone, α-methylene-N-methylpyrrolidone, N-vinyl caprolactam, N-(meth)acryloyl pyrrolidone, etc.; (meth)acrylamides, including (meth)acrylamide, N-methyl(meth)acrylamide, N-ethyl(meth)acrylamide, N-hydroxyethyl(meth)acrylamide, N,N-dimethyl(meth)acrylamide, N,N-moldthyl(meth) acrylamide, N-ethyl-N-ammethyl(meth)acrylamide, etc.; aminoalkyl(meth)acrylates, including aminoethyl(meth) acrylate, N-methylaminoethyl(meth)acrylate, N,N-dimethylaminoethyl(meth)acrylate, etc.; alkoxy-containing (meth) acrylates, including methoxyethyl(meth)acrylate, ethoxyethyl(meth)acrylate, methoxymoldthylene glycol (meth)acrylate, etc.; aromatic ring-containing (meth)acrylate, including benzyl(meth)acrylate, etc.; alkyl esters, including itaconic acid, crotonic acid, maleic acid, fumaric acid, etc. which may be substituted by an alkyl group, a fluorine-containing alkyl group, siloxanyl alkyl group, etc.; glycidyl(meth)acrylate; tetrahydrofurfuryl(meth)acrylate; 4-vinyl pyridine; heterocyclic N-vinyl monomers, including vinyl imidazole, N-vinyl piperidone, N-vinyl piperidine, N-vinyl succinimide, etc.; N-(meth)acryloyl piperidine; N-(meth)acryloyl morpholine.

It is also possible that one or two or more monomers of the above are selected and polymerized to give a macromonomer, and this macromonomer is used as a lens ingremoldnt (monomer for forming a lens).

The polymerizable dye of the present invention can also be used for an ophthalmic lens. For example, it can be used in such a way as the intraocular lens disclosed in Japanese Patent Publication No. 1999-56998A and Japanese Patent Publication No. 2003-144538A and the contact lens disclosed in International Publication No. 2004/06379A, Japanese Patent Publication No. 1994-121826A, Japanese Patent Publication No. S60-142324A and Japanese Patent Publication No. 1990-196809A.

Herein, "(meth)acrylate" means "acrylate" or "methacrylate", and this is same in (meth)acryl derivative.

For instance, in a case of obtaining an ophthalmic lens excellent in oxygen transmittance, a silicone-containing monomer such as a silicone-containing (meth)acrylate and a silicone-containing styrene derivative and a fluorine-containing alkyl(meth)acrylate can be selected, and in a case of controlling hardness of an ophthalmic lens, an alkyl(meth) acrylate, a styrene derivative including styrene or (meth) acrylic acid can be selected.

In a case of giving anti-lipid-staining property, a fluorine-containing monomer such as a fluorine-containing alkyl (meth)acrylate and a fluorine-containing styrene derivative can be selected. Further, in a case of giving hydrophilic property to a lens or obtaining a hydrous flexible ophthalmic lens, a monomer containing hydrophilic group such as a hydroxyl-containing (meth)acrylate, (meth)acrylamide, an amino alkyl (meth)acrylate, (meth)acrylic acid and N-vinyl lactum can be selected.

Still further, in order to obtain a lens material having high refractive index, a monomer containing an aromatic ring such as a styrene type monomer and a (meth)acrylate containing an aromatic ring can be selected.

As a material for an ophthalmic lens, a cross-linking agent or a macromonomer containing two or more polymerizable groups in a molecule can be used. The monomer is exemplified by ethylene glycol di(meth)acrylate, moldthylene glycol (meth)acrylate, triethylene glycol di(meth)acrylate, propylene glycol di(meth)acrylate, dipropylene glycol di(meth) acrylate, allyl(meth)acrylate, vinyl(meth)acrylate, trimethylolpropane tri(meth)acrylate, methacryloyloxy ethyl acrylate, divinyl benzene, diallyl phthalate, diallyl adipate, triallyl isocyanurate, α-methylene-N-vinyl pyrrolidone, etc. By using these monomers, a tri dimensional cross-linking structure in the resulting polymer, whereby physical properties of the material become tough and mechanical strength and hardness can be increased, and further a homogeneous, transparent, non-strained, and optically excellent ophthalmic lens can be obtained. Further, it is also possible to impart durability (chemical resistance, heat resistance, solvent resistance) to an ophthalmic lens and to suppress elution of a monomer after polymerization.

The polymerizable dye of the present invention is preferably used together with an UV ray absorber and/or other dye from a viewpoint of minor control of color of an ophthalmic lens and of imparting UV ray absorbability to the lens.

The UV ray absorber is not specifically restricted and exemplified by a benzotriazole type UV ray absorbable monomer disclosed in Japanese Patent No. 2685980 which is shown by the following general formula (7).

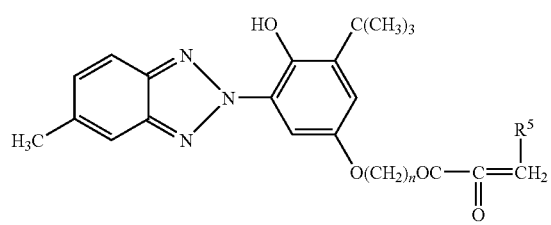

(7)

(wherein $R^5$ is H or $CH_3$, and n is 2 or 3).

Specific examples of the benzotriazole type UV ray absorber shown by the general formula (7) are 2-[2'-hydroxy-5'-(β-methacryloyloxyethoxy)-3'-t-butylphenyl]-5-methyl-2H-benzotriazole (UV1) in a case of n=2 and 2-[2'-hydroxy-5'-(γ-methacryloyloxypropoxy)-3'-t-butylphenyl]-5-methyl-2H-benzotriazole (UV2) in a case of n=3.

The dye other than the polymerizable dye of the present invention is exemplified by an azo type, an anthraquinone type, a nitro type or a phthalocyanine type polymerizable dye containing a polymerizable group such as an acryloyl group, a methacryloyl group, a vinyl group, an allyl group and an isopropenyl group. These polymerizable dyes are exempli-fied by those disclosed in Japanese Patent Publication No. 1998-251537A, Japanese Patent Publication No. 1995-28911A and Japanese Patent No. 2604799;

polymerizable dyes shown by the general formula (8)

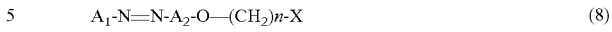

$$A_1\text{-}N{=}N\text{-}A_2\text{-}O\text{---}(CH_2)n\text{-}X \tag{8}$$

[wherein $A_1$ is an allyl group which may have a substituent, $A_2$ is an allylene group which may have a substituent, X is an acryloyloxy group, a methacryloyloxy group, a vinyl phenyl group, a vinyl phenyloxy group or a vinylphenyl alkyloxy group (the carbon number in the alkyl group is 1 to 5), and n is an integer of 1 to 5];

polymerizable dyes shown by the general formula (9)

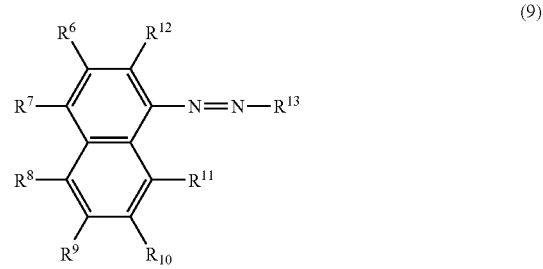

(9)

[wherein, respectively and independently, any one of $R^6$ to $R^{12}$ is a polymerizable group selected from the group consisting of an acryloyloxy group, a methacryloyloxy group, a vinyl group and an allyl group, and the rests are a substituent selected from the group consisting of a hydrogen atom, a methyl group, an ethyl group, a methoxy group, an ethoxy group, a hydroxyl group, a chlorine atom and a bromine atom, and $R^{13}$ is a substituent selected form the group consisting of those shown by the general formula (10) to (13).

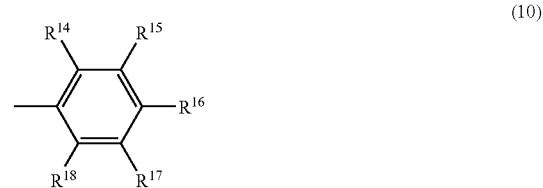

(10)

(wherein $R^{14}$ to $R^{18}$ are respectively and independently a substituent selected form the group consisting of hydrogen atom, a C1 to C18 alkyl group, a methoxy group, an ethoxy group, a hydroxyl group, a nitro group, a chlorine atom and a bromine atom)

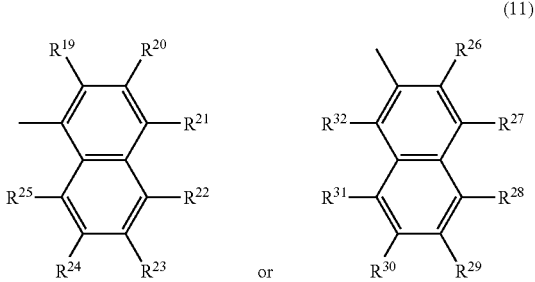

(11)

(wherein $R^{19}$ to $R^{32}$ are respectively and independently a substituent selected from the group consisting of a hydrogen atom, a C1 to C12 alkyl group, a methoxy group, an ethoxy group, a hydroxyl group, a chlorine atom and a bromine atom).

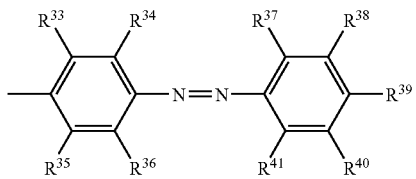
(12)

(wherein $R^{33}$ to $R^{41}$ are respectively and independently a substituent selected from the group consisting of a hydrogen atom, a C1 to C12 alkyl group, a methoxy group, an ethoxy group, a hydroxyl group, a chlorine atom and a bromine atom).

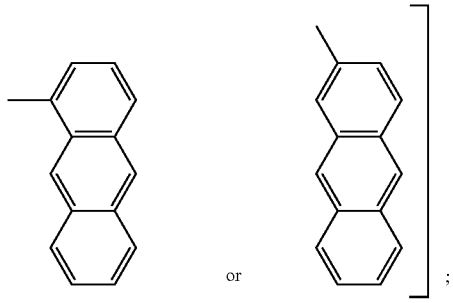
(13)

polymerizable dyes shown by the general formula (14)

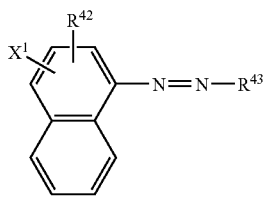
(14)

[wherein $X^1$ is

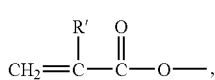,

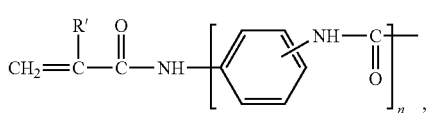,

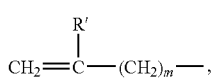,

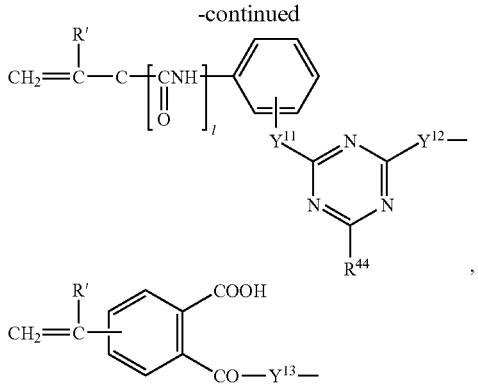

and $R^{42}$ is a hydrogen atom, a hydroxyl group, a methyl group, an ethyl group, a methoxy group, an ethoxy group or a halogen atom. $R^{43}$ is a benzene derivative, a naphthalene derivative or an anthracene derivative, wherein a part of hydrogen atoms of the aromatic member may be substituted by a C1 to C8 alkyl group, a hydroxyl group, a methoxy group, an ethoxy group, a nitro group, a halogen atom, or

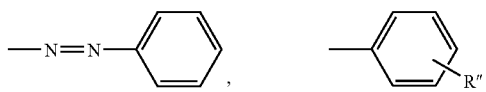

(wherein R" is hydrogen atom, a methyl group or a sulfonic acid group). $R^{44}$ is hydrogen atom, a hydroxyl group, a halogen atom or

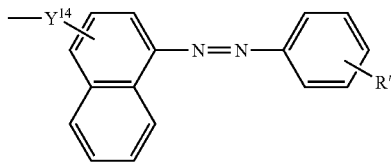

(wherein R' is a hydrogen atom or a methyl group, n, m and l are respectively 0 or 1, and $Y^{11}$ to $Y^{14}$ are respectively —NH— or —O— and a part of hydrogen atoms of the aromatic ring shown by the said general formula (14) may be substituted by the same substituent as in the above $R^{42}$);

polymerizable dyes shown by the general formula (15)

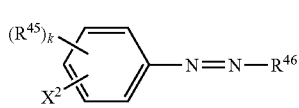
(15)

(wherein $X^2$ is the same group as $X^1$ in the above general formula (14) or

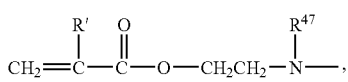,

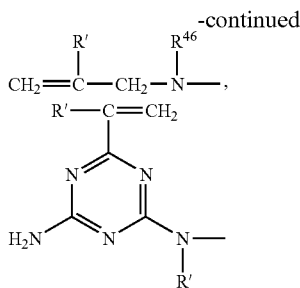

$R^{45}$ is the same group (excepting hydrogen) as $R^{42}$ in the above general formula (14). $R^{46}$ is the same group as $R^{43}$ in the general formula (14) or

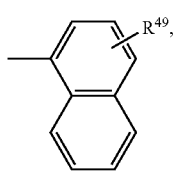 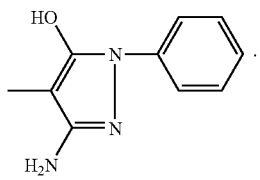

$R^{47}$ and $R^{48}$ are respectively a hydrogen atom or a C1 to C3 alkyl group. $R^{49}$ is a hydrogen atom, —$NH_2$ or

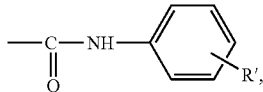

wherein R' is the same group as in the above general formula (14), and k is 0 or 1);

polymerizable dyes shown by the general formula (16)

(16)

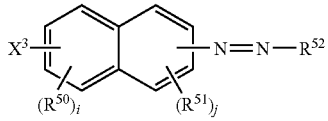

(wherein $X^3$ is the same as $X^1$ in the above general formula (14), and $R^{50}$ and $R^{51}$ are respectively the same group as $R^{42}$ in the general formula (14) or —$SO_3Na$, and $R^{52}$ is the same as $R^{43}$ in the above general formula (14). i and j are respectively an integer of 0 to 3);

polymerizable dyes shown by the general formula (17)

(17)

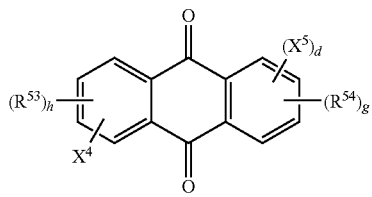

(wherein $X^4$ and $X^5$ are respectively and independently)

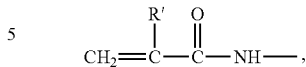

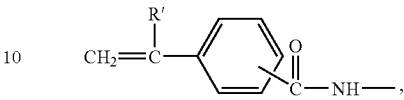

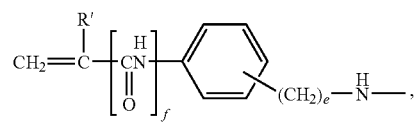

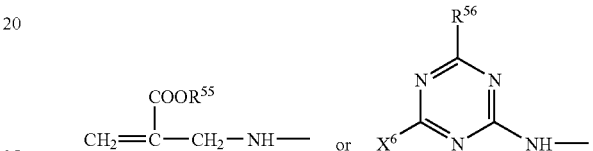

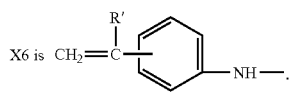

$R^{53}$ and $R^{54}$ are respectively and independently an amino group, a hydroxyl group, a sulfonic acid group, a nitro group, a halogen atom, a C1 to C3 alkylamino group, a C1 to C3 alkoxyl group, a C1 to C3 alkylamide group, or

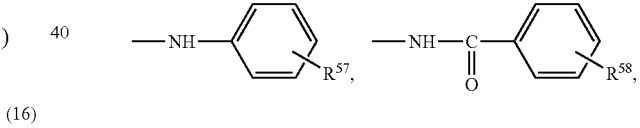

$R^{55}$ is —H or a C1 to C3 alkyl group. $R^{56}$ is —H, —$CH_3$ or —$NHNH_2$. $R^{57}$ and $R^{58}$ are respectively and independently —H, a C1 to C3 alkyl group or a C1 to C3 alkoxyl group. R' is the same group as the above general formula (14), h, d and g are respectively 0 to 3, or 0 to 1 or 0 to 4 (providing that d+g≦4), and f is 0 or 1, and e is an integer of 0 to 6);

polymerizable dyes shown by the general formula (18)

(18)

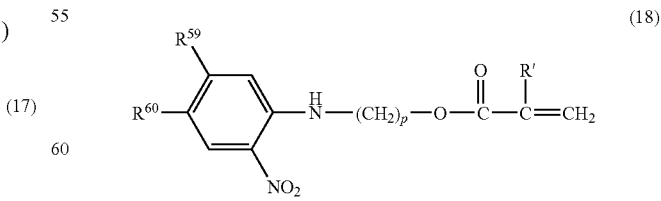

(wherein $R^{59}$ and $R^{60}$ are respectively and independently —H or a C1 to C3 alkyl group. R' is the same group as in the above general formula (14), and p is an integer of 0 to 3);

polymerizable dyes shown by the general formula (19)

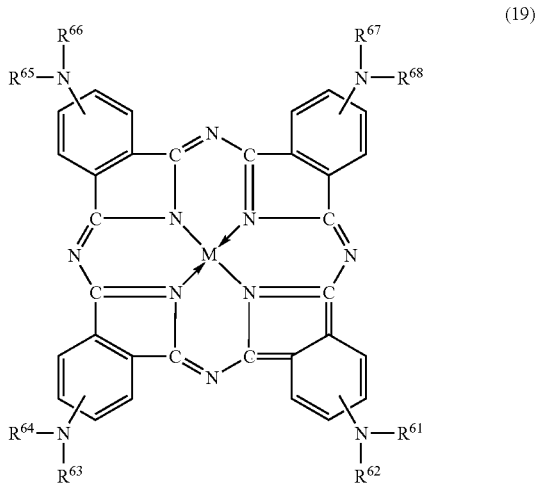

(wherein $R^{61}$ to $R^{68}$ are —H or —CO-A, and A is a C1 to C17 alkyl group or

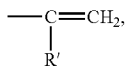

and at least one thereof is a (meth)acryloyl group. M is a metal atom (for instance copper), and R' is the same group as in the above general formula (14)).

The object ophthalmic lens (a contact lens, an intraocular lens, etc.) is obtained by incorporating the above monomer together with the benzophenone type polymerizable dye of the present invention in an optional ratio, followed by mixing homogeneously and copolymerizing.

A ratio of the benzophenone type dye of the present invention is, though depending upon a thickness of a lens, preferably 0.001 to 1 part by weight, still preferably 0.005 to 0.5 part by weight, more preferably 0.06 part by weight, relative to 100 parts by weight of the total polymerizable monomer mixture constituting an ophthalmic lens. When the incorporating ratio is less than 0.001 part by weight, suitable coloring tends to be impossible, and when it is over 1 part by weight, a color tends to be too dark, and transparency tend to be reduced, and also the physical properties (for instance strength) tends to be reduced and further the polymerizable dye tends to be eluted easily after polymerization.

Further, a ratio of a cross-linking agent to be incorporated is preferably within a range of 0.01 to 10 parts by weight relative to 100 parts by weight of the total monomer mixture constituting an ophthalmic lens. When it is less than 0.01 part by weight, its effect tends to be difficult to obtain, and when it is over 10 parts by weight, the resulting lens tends to be fragile.

The production of an ophthalmic lens can easily be conducted by blending homogeneously the polymerizable dye of the present invention and other ingremoldnts for a lens and if necessary a polymerization initiator, followed by a method so far been generally conducted in the technical field. For instance, to a mixture of a monomer for forming a lens, a polymerizable dye, and the like is added homogeneously a radical polymerization initiator optionally and the like, and the resultant is gradually heated within a range of a room temperature to about 130° C., or irradiated with an electromagnetic wave such as a micro wave, an UV ray and a radial ray (gamma ray) to conduct polymerization, whereby a lens material can be formed. The polymerization may be a bulk polymerization or a solution polymerization using a solvent, etc., and in a case of heat polymerization, a temperature may be increased in stepwise, and other various manners can also be applied.

The specific examples of the radical polymerization initiator are azobisisobutylonitrile, azobisdimethyl valeronitrile, benzoyl peroxide, tert-butyl hydroperoxide, cumene hydroperoxide, benzoyl peroxide, etc., and one or two or more thereof is selected to use. An amount to be used is preferably about 0.01 to 1 part by weight relative to 100 parts by weight of the total monomer mixture to be polymerized. In a case of polymerizing with the use of a light, etc., it is preferable to add further a photo polymerization initiator and a sensitizer.

In a case of molding as an ophthalmic lens such as a contact lens and an intraocular lens, a molding method so far generally been conducted by a skilled person can be applied, and, for instance, there can be applied such a manner that polymerization is conducted in a suitable mold or container to obtain a stick like, a block like or a plate like material (polymer), and then the resultant is processed by a mechanical operation such as a cutting operation and an abrasive operation, or alternatively a mold having the desired shape is prepared and polymerization of a monomer is conducted in the mold to obtain a molded article, and, if necessary, the resultant is subjected to a mechanical operation.

In a case of molding an intraocular lens, a haptic of the lens may separately be molded and mounted to the lens, or it may be molded at the same time (integrated) with the lens.

Further, in order to make a surface of a lens hydrophilic, the lens may be subjected to a plasma treatment, if necessary, and as a treatment device and method in this case, a so far known conventional device and method can be applied. Treatment is preferably conducted under such conditions as in a helium, neon, argon and other inert gas atmosphere or an air, oxygen, nitrogen, carbon monoxide, carbon dioxide and other gas atmosphere under pressure: about 0.0001 to several Torr, discharge: about several to 100 W for several to several ten seconds, and still preferably the gas is air, oxygen and argon, pressure is about 0.05 to 3 Torr, discharge is about 10 to 60 W and time is several minutes.

In the following, the present invention is explained in more details referring to Examples, but the present invention is not limited to those Examples.

EXAMPLE

Example 1

Synthesis of 2,4-dihydroxy-5-(4-(2-(N-(2-methacryloyloxyethyl)carbamoyloxy)ethyl)phenylazo)benzophenone (BMAC) (catalyst: dibutylstannic (IV) dilaurate, a compound for introducing polymerizable group: 2-isocyanate ethyl methacrylate)

In a 500 ml three-necked flask, 6.00 g (0.0166 mol) of 2,4-dihydroxy-5-(4-(2-hydroxyethyl)phenylazo)benzophenone (UV-PEP) was charged, and 250 ml of dichloromethane was added to dissolve. To the resultant were added 3.85 g (3.51 mL, 0.0248 mol) of 2-isocyanate ethyl methacrylate and dropped by a syringe two drops of dibutyl tin (IV) dilaurate. After about 23 hours, the reaction solution was transferred to a 1 L recovery flask and dichloromethane was evaporated in vacuo. To the residue was added 300 mL of methanol to give a suspension, followed by stirring and washing for about 2 hours and filtering in vacuo. The residue on a filter paper was transferred to a 2 L Erlenmeyer flask and 1.5 L of ethanol was added thereto to dissolve under refluxing by heating with installing a Dimroth condenser. After keeping standing overnight at room temperature, the precipitates were recovered by filtration in vacuo, and the resultant was dried by a vacuum drier at 50° C. for about 24 hours to give orange powder. Yield was 7.81 g (91.1%).

The resulting compound was analyzed by HPLC to obtain purity. A column of Finepak SIL C18T-5 250×4.6 mm (I.D.) (Nippon Bunko Kogyo K.K.), and a mobile phase of methanol/distilled water=80/20 (v/v) were used. Purity was confirmed as 96.8% from a peak area ratio at 210 nm.

The $^1$H NMR spectrum of the resulting compound was as follows:

δ 1.93 (t, 3H, $CH_3$), 2.97-3.01 (2H, $CH_2$), 3.48-3.49 (2H, $CH_2$), 4.20-4.23 (2H, $CH_2$), 4.30-4.33 (2H, $CH_2$), 4.92 (1H, NH), 5.58 (1H, CH=), 6.11 (1H, CH=), 6.57 (t, 1H, Ar—H), 7.26-7.75 (m, Ar—H), 8.21 (t, 1H, Ar—H), 12.89 (t, 1H, Ar—OH), 13.96 (t, 1H, Ar—OH)

From the measurement result, two signals considered to correspond to a phenolic hydroxyl group were observed at δ 12.89 and 13.96, and thus this compound was confirmed as BMAC wherein a polymerizable group was introduced into a primary hydroxyl group of UV-PEP.

An infrared absorption spectrum of the resulting compound was measured by an infrared spectrophotometer (Spectrum One K.K. Perkinelmer), whereby two absorptions (1688, 1720 $cm^{-1}$) considered to be by a carbonyl group other than absorption by a carbonyl group originated from UV-PEP (1624 $cm^{-1}$) were observed. From this, it was confirmed that a polymerizable group was introduced into the resulting compound.

Further, a UV visible absorption spectrum (280 to 800 nm) was measured by a UV visible light spectrophotometer (UV-3150 K.K. Shimazu Seisakusho) (FIG. 1). As the result of the measurement, the resulting compound contained UV ray absorption characteristics at 380 nm or less and visual light absorption characteristics at about 380-500 nm.

Example 2

Synthesis of BMAC (catalyst: tris(2,4-pentane dionate) iron (III), a compound for introducing polymerizable group: 2-isocyanate ethyl methacrylate)

In a 1 L recovery flask, 15.00 g (41.4 mmol) of 2,4-hydroxy-5-(4-(2-hydroxyethyl)phenylazo) benzophenone (UV-PEP) and 0.420 g (1.19 mmol) of tris(2,4-pentane dionate) iron (III) were charged, and 700 ml of dichloromethane was added to dissolve. To the resultant were added 8.80 mL (62.2 mmol) of 2-isocyanate ethyl methacrylate, followed by stirring with installing a Dimroth condenser. After about 127 hours, the reaction solution was evaporated in vacuo. To the residue was added 1 L of methanol to give a suspension, followed by stirring and washing for about 1 hour and filtering in vacuo. The residue on a filter paper was dissolved in 200 mL of chloroform. About 50 g of silica gel was suspended in a suitable amount of chloroform and poured into Hirsch type funnel (Φ60 mm) wherein a filter paper was equipped to fill the paper. A filter paper was placed on the silica gel filled and a chloroform solution in which the above prepared residue was dissolved was poured thereto. The solution was filtered and additionally about 600 mL of chloroform was gradually poured to recover all filtered solution, followed by distilling in vacuo. The resulting residue as suspended in 3 L of ethanol to dissolve under refluxing by heating and filtered under heating. After keeping standing overnight at room temperature, the precipitates were recovered by filtration in vacuo, and the resultant was dried by a vacuum drier at 50° C. for about 23 hours to give crystalline orange powder. Yield was 19.02 g (88.8%).

Similarly to Example 1, the resulting compound was subjected to HPLC to obtain purity. Purity was 98.7%.

Further, as the result of measurement of the $^1$H NMR spectrum of the resulting compound similar to Example 1, the compound showed the same spectrum as in Synthetic Example 1 and two signals considered to correspond to a phenolic hydroxyl group were observed at δ 12.89 and 13.96, and thus this compound was as in Example 1, confirmed as BMAC wherein a polymerizable group was introduced into a primary hydroxyl group of UV-PEP.

The infrared absorption spectrum and the UV visual light absorption spectrum of the resulting compound were the same as in the compound obtained in Example 1.

Comparative Example 1

Synthesis of 2,4-dihydroxy-5-(p-methacryloyloxyethyl phenylazo) benzophenone (catalyst: triethylamine, a compound introducing a polymerizable group: methacryloyl chloride)

7.24 g of UV-PEP and 5.0 g of triethylamine were dissolved in 100 ml of benzene, and to the solution was gradually added a methacryloyl chloride solution (2.41 g/50 ml benzene) with agitation. After keeping standing for about 3 hours, the solution was washed with distilled water, and filtered, and then dried to solidify in vacuo. The resulting dried solid was recrystallized from 500 ml of chloroform-hexane (2:5), whereby only a trace amount of the object compound was obtained.

Comparative Example 2

Condensation of UV-PEP with methacrylic acid using dicyclohexyl carbodiimide/4-dimethylamino pyridine (synthesis of 2,4-dihydroxy-5-(p-methacryloyloxyethyl phenylazo) benzophenone)

0.35 g (2.84 mmol) of 4-dimethylamino pyridine, 0.5 g (1.38 mmol) of 2,4-dihydroxy-5-(4-(2-hydroxyethyl)phenylazo) benzophenone (UV-PEP) and 0.23 mL (2.71 mmol) of methacrylic acid were dissolved in 15 mL of dichloromethane, and kept at about 20° C. by a water bath with magnetic agitation. 0.60 g (2.91 mmol) of dicyclohexyl carbodiimide was dissolved in about 10 mL of dichloromethane, and the solution was dropped to the above reaction system by a dropping funnel. After agitation for certain time, white powder was precipitated. After reaction for about 22 hours, the reaction solution was filtered in vacuo to remove the precipitated white powder and the solvent was evaporated in vacuo, and the residue was subjected to HPLC.

HPLC Analysis

The reaction solutions of Example 1 and Example 2 and Comparative Example 2 were subjected to HPLC analysis under the following conditions, and percentages of the peak area were measured on BMAC in cases of Examples 1 and 2 and on 2,4-dihydroxy-5-(p-methacryloyloxyethyl phenylazo) benzophenone in cases of Comparative Example 2, whereby yields of the object compounds were obtained. Result is shown in Table 1.

(Analysis Conditions)

Column: Finepak SIL C18T-5 250×4.6 mm (I.D.) Nippon Bunko Kogyo K.K. Mobile phase: methanol/distilled water=80/20 (v/v) Isocratick elution
Flow rate: 1 mL/min.
Injection value: 20 µL
Column temperature: 40° C.
Detection: 350 nm

TABLE 1

|  | Reaction time | Object compound | Non-reacted UV-PEP | Total amount of by-products |
|---|---|---|---|---|
| Ex. 1 | 22 hours | 100% | 0% | 0% |
| Ex. 2 | 50 hours | 97.3% | 2.7% | 0% |
| Com. Ex. 2 | 22 hours | 26.2% | 9.6% | 64.2% |

Example 3

Figure 2:
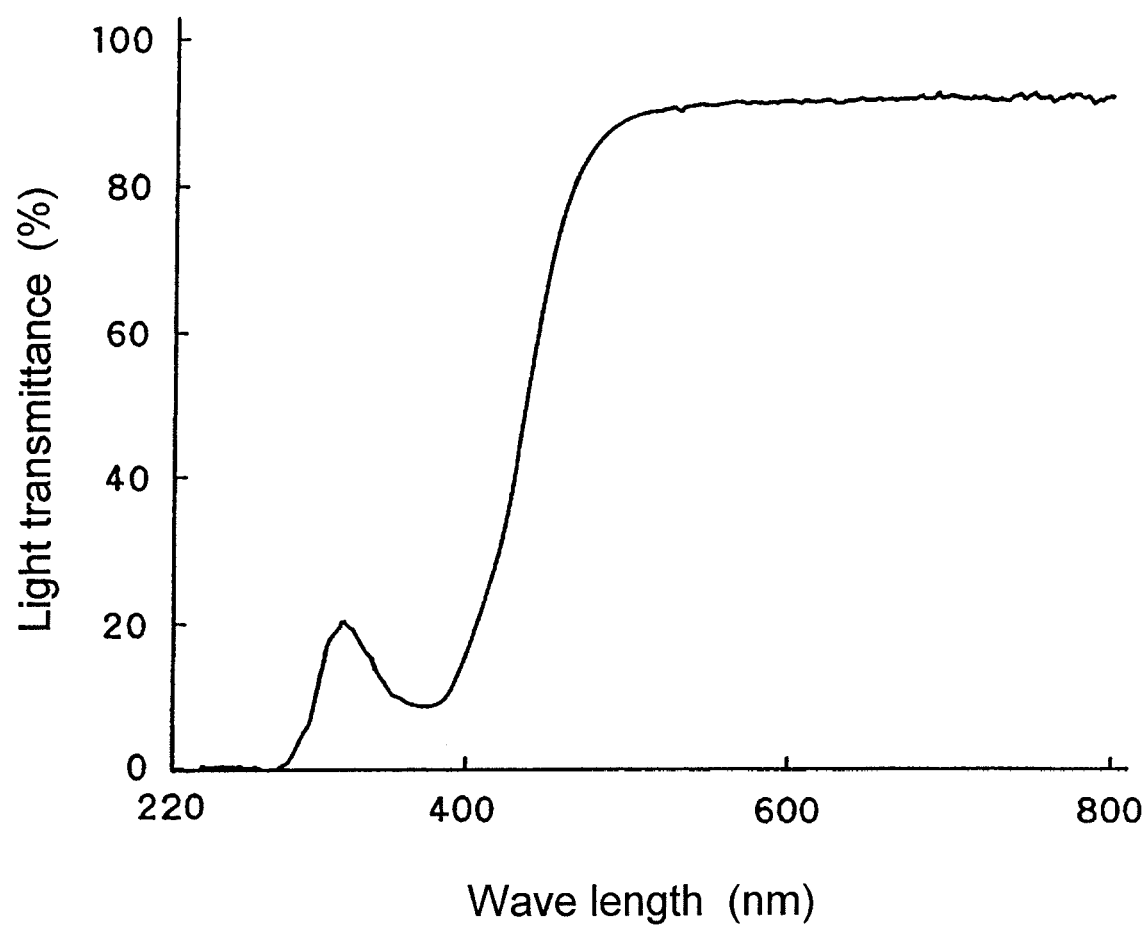
FIG. 2 is a chart showing UV visible light transmission spectrum of a lens obtained in Example 1.

0.03 part by weight of BMAC synthesized in Example 1, 100 parts by weight of phenoxyethyl acrylate, 15 parts by weight of ethyl acrylate and 0.5 part by weight of 2,2'-azobis (2,4-dimethyl valeronitrile) were blended homogeneously, and the resultant was poured into a lens mold. Then the blended solution was polymerized at 80° C. for 40 minutes to form a lens. The resulting lens was used as a sample for measuring light transmittance of a ray having a wave length of 220 to 800 nm (FIG. 2). Further, after the lens was subjected to elusion treatment by immersing in ethanol at 40° C. for 24 hours, the light transmittance was measured again, whereupon no change in the spectrum before and after the elution treatment. This shows that the polymerizable dye was chemically bonded in the material.

Example 4

A lens was prepared by the same manner as in Example 3 excepting adding further 0.15 part by weight of 2-[2'-hydroxy-5'-(2"-methacryloyloxyethoxy)-3'-tert-butylphenyl]-5-methyl-2H-benzotriazole as an UV absorber.

Figure 3:
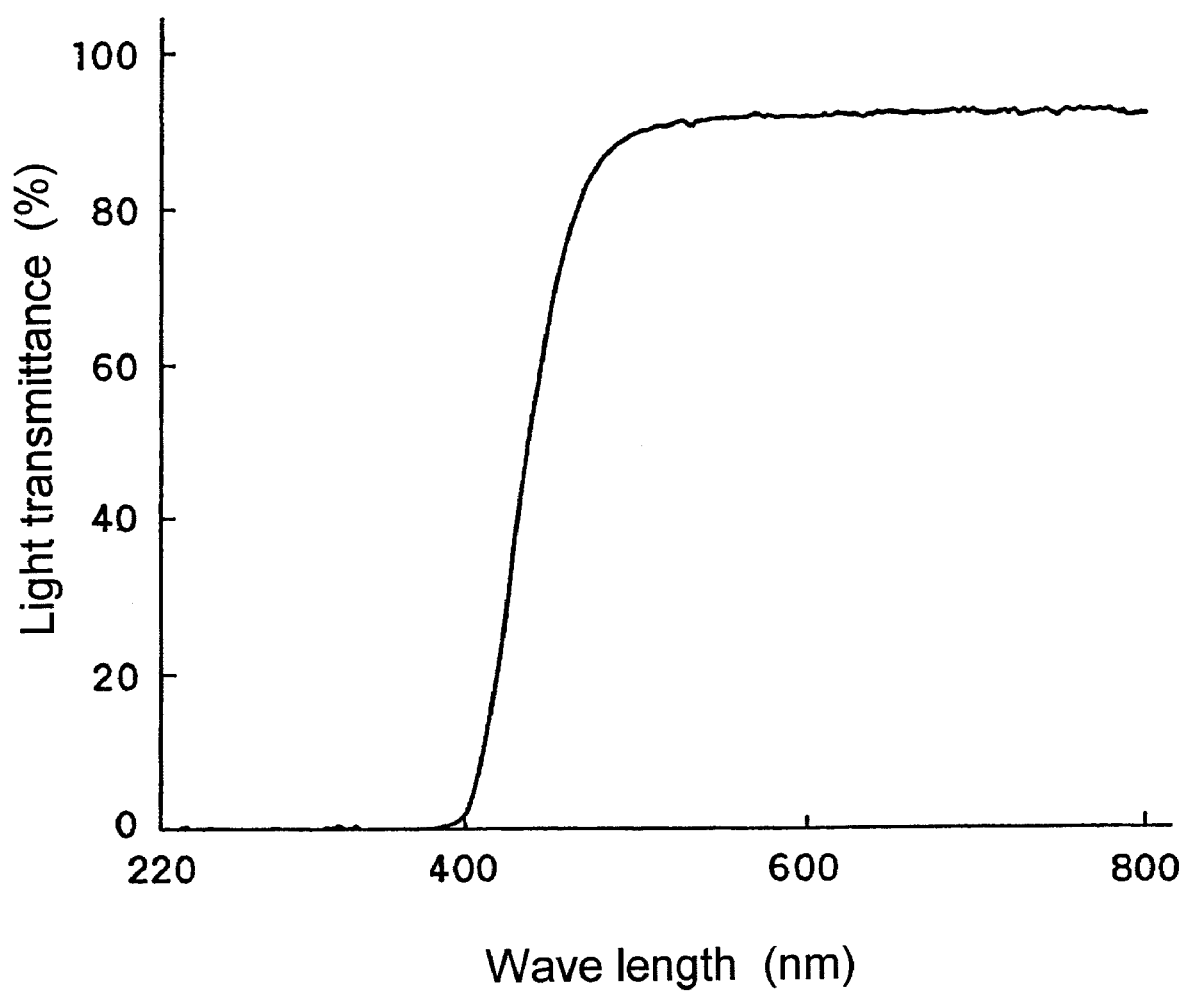
FIG. 3 is a chart showing UV visible light transmission spectrum of a lens obtained in Example 2.

The resulting lens was used as a sample, and after the same manner as in Example 3, light transmittance of a ray at a wave length of 220 to 800 nm was measured (FIG. 3). As a result, no change in spectrum of light transmittance before and after elution treatment, and thus it was confirmed that no elution after polymerization occurred even co-use of other UV absorber together with the polymerizable dye of the present invention.

Comparative Example 3

A copolymer was prepared by the same manner as in Example 3 excepting using 2,4-dihydroxy-5-(p-methacryloyloexyethyl phenylazo) benzophenone synthesized in Comparative Example 1 in place of BMAC synthesized in Example 1, and elution was measured. As the result, no elution of a dye was observed.

INDUSTRIAL APPLICABILITY

As the benzophenone type polymerizable dye containing an urethane bond of the present invention contains an UV ray absorbing part and a visible light (about 380 to 500 nm) absorbing part in one molecule, it shows light transmittance near to a natural crystalline, and thus it is useful as a material of an ophthalmic lens. Further, due to the urethane bond contained, the polymerizable dye of the present invention is more flexible than conventional polymerizable dyes, particularly even when it is used in a fordable intraocular lens, its flexible properties are not damaged, and as a chromophore and a polymerizable group are sterically-separated form each other, it is valuable also from such a viewpoint that no polymerization suppression is given. Still further, the said polymerizable dye can be copolymerized with other material for an ophthalmic lens, and thus the resulting material for an ophthalmic lens shows remarkably excellent resistances against light and chemicals, and also excellent fastness and additionally elution from the ophthalmic lens can be suppressed. Therefore, it is possible by using the polymerizable dye of the present invention to obtain an excellent ophthalmic lens having high safety, no decoloring nor color change due to elution of a dye. Further, it can be used to coating agent and a building material other than the above use.

Still additionally, according to the method of producing the benzophenone type polymerizable dye of the present invention, even when a material such as UV-PEP or others containing one primary hydroxyl group and two phenolic hydroxyl groups is used, an isocyanate compound containing a polymerizable double bond can be reacted selectively with a primary hydroxyl group, and thus the object compound can be obtained at a high yield. Thus purification can be simple, and complex working can be reduced, and also it is advantageous from cost point of view.

The invention claimed is:

1. A benzophenone type polymerizable dye shown by the following formula (1)

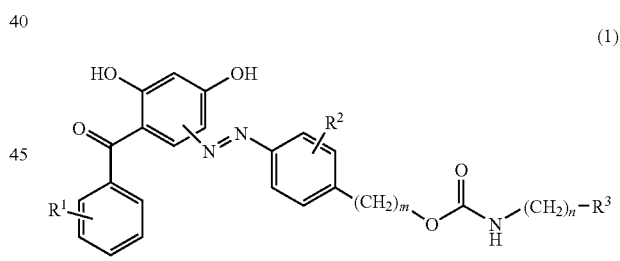

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m and n are respectively and independently an integer of 0 to 18, and $R^3$ is a polymerizable functional group of the formula

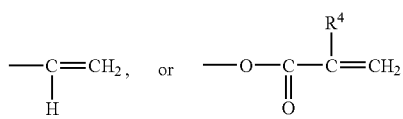

wherein $R^4$ is a hydrogen atom or a methyl group).

2. A benzophenone type polymerizable dye shown by the following formula (2)

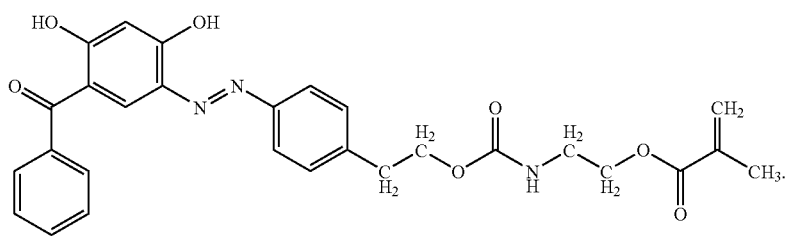

(2)

3. A method for producing a benzophenone type polymerizable dye containing an urethane bond comprising a process of reacting a compound shown by the following general formula (3) with a compound shown by the following formula (4)

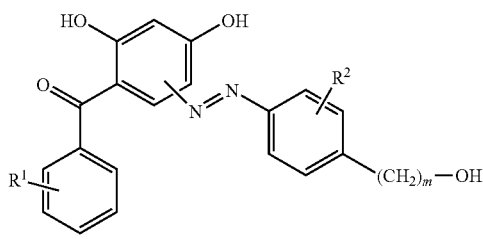

(3)

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m is an integer of 0 to 18)

$$O{=}C{=}N{-}(CH_2)_n{-}R^3 \text{tm (4)}$$

(wherein $R^3$ is a polymerizable functional group of the formula

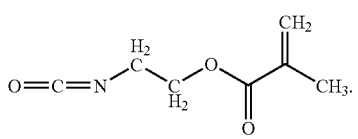

in which $R^4$ is a hydrogen atom or a methyl group, and n is an integer of 0 to 18).

4. The method of claim 3, wherein the compound shown by the above formula (3) is the compound shown by the following formula (5), and the compound shown by the above formula (4) is the compound shown by the following formula (6)

(5)

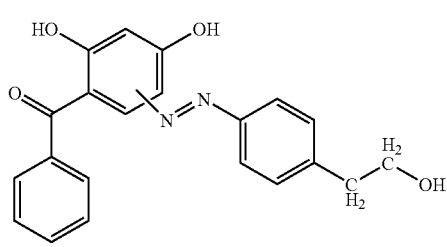

-continued (6)

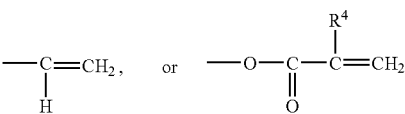

5. The method of claim 4, wherein the reaction is conducted in the presence of a catalyst of one or more of an organic metal compound and/or a metal complex.

6. An ophthalmic lens comprising polymerizable monomers including; the benzophenone type polymerizable dye selected from the group consisting of benzophenone type polymerizable dye shown by the following formula (1) and benzophenone type polymerizable dye shown by the following formula (2), (1)

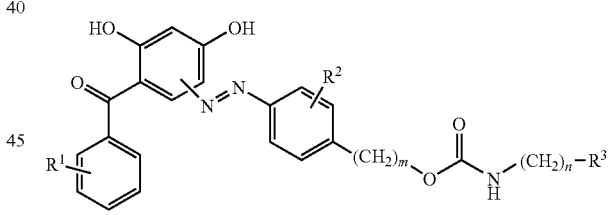

(wherein $R^1$ and $R^2$ are respectively and independently a hydrogen atom, a hydroxyl group, a carboxylic group, a C1 to C8 alkyl group, a C1 to C8 alkoxy group, a sulfonic acid group or a benzyloxy group, and m and n are respectively and independently an integer of 0 to 18, $R^3$ is a polymerizable functional group of the formula

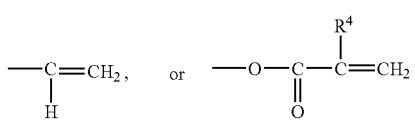

wherein $R^4$ is a hydrogen atom or a methyl group); and

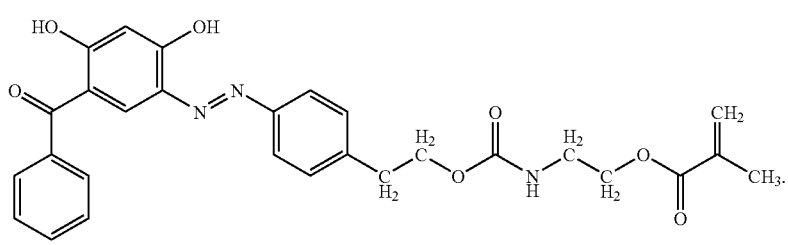

(2)

7. The ophthalmic lens of claim 6, wherein an amount of the benzophenone type polymerizable dye is 0.001 to 1.0 part by weight relative to 100 parts by weight of the total polymerizable monomers constituting the ophthalmic lens.

8. The ophthalmic lens of claim 7, wherein an UV absorber and/or other dye is further incorporated.

9. The method of claim 3, wherein the reaction is conducted in the presence of a catalyst of one or more of an organic metal compound and/or a metal complex.

10. The ophthalmic lens of claim 6, wherein the lens comprises the benzophenone type polymerizable dye shown by the formula (1).

11. The ophthalmic lens of claim 6, wherein the lens comprises the benzophenone type polymerizable dye shown by the formula (2).

12. The ophthalmic lens of claim 6, wherein an UV absorber and/or other dye is further incorporated.

13. The benzophenone type polymerizable dye shown by the above formula (1) of claim 1, wherein m is 2, and n is an integer of 0 to 2.

14. The benzophenone type polymerizable dye shown in the above formula (1) of claim 1, wherein m is 2, n is 2, and $R^3$ is a polymerizable functional group of the formula

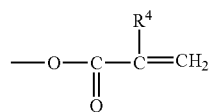

in which $R^4$ is a hydrogen atom or a methyl group.

15. The method of claim 3, wherein m in the above formula (3) is 2, and n in the above general formula (4) is an integer of 0 to 2.

16. The method of claim 3, wherein m in the formula (3) is 2, n in the formula (4) is 2, and $R^3$ in the formula (4) is a polymerizable functional group of the formula

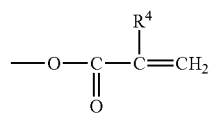

in which $R^4$ is a hydrogen atom or a methyl group.

* * * * *